(12) United States Patent
Pollock et al.

(10) Patent No.: US 6,899,545 B2
(45) Date of Patent: May 31, 2005

(54) COUPLING AND METHOD FOR PRODUCING A HERMETIC SEAL

(75) Inventors: John A. Pollock, Wilton, NH (US); Anthony DeSantis, New Boston, NH (US)

(73) Assignee: Special Hermetic Products, Inc., Wilton, NH (US)

( * ) Notice: Subject to any disclaimer, the term of this patent is extended or adjusted under 35 U.S.C. 154(b) by 0 days.

(21) Appl. No.: 10/914,887

(22) Filed: Aug. 10, 2004

(65) Prior Publication Data

US 2005/0085102 A1    Apr. 21, 2005

Related U.S. Application Data

(60) Provisional application No. 60/511,987, filed on Oct. 16, 2003.

(51) Int. Cl.$^7$ .............................................. H01R 12/00
(52) U.S. Cl. ................................ 439/63; 174/152 GM; 361/302; 439/566; 439/572
(58) Field of Search ............................ 439/63, 83, 578, 439/579, 581, 566; 174/151, 152 GM; 361/302, 361/816; 333/254, 260

(56) References Cited

U.S. PATENT DOCUMENTS

| | | | | |
|---|---|---|---|---|
| 2,223,031 A | * | 11/1940 | Edwards ....................... 53/405 |
| 3,721,948 A | * | 3/1973 | Brandt et al. ................ 439/695 |
| 4,124,772 A | * | 11/1978 | Baggiani .................... 174/71 C |
| 4,556,271 A | * | 12/1985 | Hubbard ...................... 439/277 |
| 4,724,409 A | * | 2/1988 | Lehman ....................... 333/260 |
| 4,841,101 A | * | 6/1989 | Pollock ............... 174/152 GM |
| 4,964,805 A | * | 10/1990 | Gabany ......................... 439/63 |
| 5,142,436 A | * | 8/1992 | Lee et al. .................... 361/302 |
| 5,316,499 A | * | 5/1994 | Scannelli et al. ........... 439/534 |
| 5,563,562 A | * | 10/1996 | Szwec ......................... 333/260 |
| 5,622,531 A | * | 4/1997 | Yamada et al. ............ 8/115.66 |
| 5,683,255 A | * | 11/1997 | Menze ......................... 439/63 |
| 5,711,676 A | * | 1/1998 | Michael, III ................. 439/63 |
| 5,797,765 A | * | 8/1998 | Barnett et al. ................ 439/63 |
| 5,855,675 A | * | 1/1999 | Doering et al. ............. 118/719 |
| 5,867,361 A | * | 2/1999 | Wolf et al. .................. 361/302 |
| 6,031,710 A | * | 2/2000 | Wolf et al. .................. 361/302 |
| 6,275,369 B1 | * | 8/2001 | Stevenson et al. .......... 361/302 |
| 6,354,855 B2 | * | 3/2002 | Annequin ................... 439/248 |
| 6,490,148 B1 | * | 12/2002 | Allen et al. ................. 361/302 |
| 6,663,424 B1 | * | 12/2003 | Wyse et al. ................. 439/581 |

* cited by examiner

*Primary Examiner*—Tho D. Ta
*Assistant Examiner*—Larisa Tsukerman
(74) *Attorney, Agent, or Firm*—Peter A. Nieves; Hayes Soloway PC (57) ABSTRACT

A coupling and method for forming a hermetic seal between a component and a housing is provided in which a mechanical joint is formed between an exposed interior surface of the component and an exterior surface of a protrusion on the housing. The coefficients of thermal expansion of the connector and the housing are chosen such that the solder joint is in compression during cool down of the solder.

21 Claims, 12 Drawing Sheets

FIG. 1

Prior Art

FIG. 2

Prior Art

FIG. 3

Prior Art

FIG. 4

Prior Art

COUPLING AND METHOD FOR PRODUCING A HERMETIC SEAL

CROSS-REFERENCE TO RELATED APPLICATION

This application claims priority to U.S. Provisional Application entitled, "System and Method for Hermetically Sealing Components to Housings," having Ser. No. 60/511,987, filed Oct. 16, 2003, which is entirely incorporated herein by reference.

FIELD OF THE INVENTION

The present invention is generally related to hermetic seal couplings and, more particularly, is related to a hermetic seal formed between a component and a housing.

BACKGROUND OF THE INVENTION

Components may be coupled to housings to form a connection and a hermetic seal. The housings may be made from a variety of materials having coefficients of thermal expansion (CTE) ranging from kovar (CTE=5 ppm/° C.) to aluminum (CTE=23 ppm/° C.). Components with a CTE less than or equal to the housing can be effectively joined and produce a hermetic seal with soft solder since this eliminates or limits solder tensile strain to acceptable limits during cool down from the soldering temperature. However, when the component with a CTE greater than the housing, for example a steel component (CTE=15 ppm/° C.), is soldered to a kovar housing, an effective solder joint is difficult as the strain in the joint upon cool down may exceed the failure strain of the solder. The use of hard solder, for example 80/20 Au/Sn, produces extremely high tensile stresses in the vicinity of the ultimate strength of the solder (40,000 psi) with low CTE housing materials. These stresses can produce at least two problems. First, the stresses can be passed on, in part, to the metal-to-glass seal interface and lead to seal failure (i.e. glass-to-metal separation or glass cracking). Second, the stresses can also produce failed solder joints particularly when any stress concentrator is present due to geometric factors or other external stresses applied during product processing or field use.

FIGS. 1–4 show a prior art method of joining an electrical component 100 to a housing 110. The component 100 has an electrical conductor 102 extending from at least one end. The electrical conductor 102 is electrically insulated from a component body 104 of the component 100 by an insulator 106. The component 100 is coupled to the housing 110 with solder that fills a gap 108 between an exterior surface 112 of the component 100 and an interior surface 114 of a hole formed in the housing 110. The housing 110 is often made from a material (typically kovar) having a similar CTE as the component 100 (also typically kovar) that is coupled thereto. The component 100 and the housing 110 may be coupled with a soft solder, for example, Sn 62, Sn 63, Sn 96, or Sb 5; or a hard solder, for example, 80/20 Au/Sn. Soft solders are feasible structurally for many applications but are less desirable for other applications such as connectors where cables may provide high stress that may lead to eventual failure. Hard solders provide necessary structural strength, but differences between the CTE of the housing 110 and component 100 (kovar, CTE=5 ppm/° C.) and the solder (CTE=15 ppm/° C.) can produce critically high stress levels in the solder joint. This tensile stress is imparted into the hard solder joint upon formation and remains in the solder joint for the life of the product due to the non-creep nature of the hard solder.

Steel is a common material for the component 150 for cost and performance reasons. In this configuration, a satisfactory solder joint may be formed when the component 150 is soldered to a housing 152 having a CTE greater than or equal to the CTE of the component 150, but an unsatisfactory solder joint is formed when the component 150 is soldered into a housing 152 having a CTE less than the component 150, since strain in the solder can be intolerable upon cool down. For example, a satisfactory solder joint is formed between a steel component and a steel, stainless steel, aluminum, copper, or brass housing and an unsatisfactory solder joint is formed between a steel component and a kovar housing (CTE=5 ppm/° C.).

Therefore, there is a need for a hermetic coupling and method for producing a hermetic seal between a component and a housing that does not suffer from the deficiencies of the prior art.

SUMMARY OF THE INVENTION

Embodiments of the present invention provide a hermetic coupling and a system and method for producing a hermetic seal between components and a housing. Briefly described in architecture, one embodiment of the system, among others, can be implemented as follows. A component is provided having a component body with a generally circular cross section, an exposed solderable interior surface, and a signal cable. The component is coupled to the component body.

In one aspect, the invention features a connector having a component with a skirt with an interior surface surrounding a signal cable. The connector also has a housing with an opening sized to receive the signal cable and the opening is surrounded by a protrusion with an exterior surface. The protrusion is sized to receive the interior surface of the skirt and provide a solderable gap.

In another aspect, the invention features a method of coupling a component to a housing. The method includes the steps of positioning a signal cable of a component through an opening in a housing and positioning a component skirt of the component over a protrusion of the housing. The method further involves applying heat to the housing and the component skirt. The method further includes applying solder to a mouth of a first solder gap. The method draws solder through the first solder gap and into a second solder gap perpendicular to the first solder gap.

The present invention can also be viewed as providing methods for providing a hermetic seal for component assemblies. In this regard, one embodiment of such a method, among others, can be broadly summarized by the following steps: obtaining a housing having a cylindrical protrusion with a solderable exterior surface; obtaining a component having an exposed interior solderable surface; and forming a solder joint between the interior surface of the component and the exterior surface of the protrusion.

Other couplings, systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

For exemplary purposes, the following describes a coupling assembly with a hermetic seal and method of providing the same. It should be noted, however, that alternative coupling assemblies with a hermetic seal may be provided in accordance with the present invention. The present invention is intended to include different component assemblies where a solder joint between a component and a housing provides a hermetic seal.

FIGS. 5–8 show typical components 200, for example coupled to a housing 210, in accordance with an exemplary embodiment of the invention. Examples of the components can include but are not limited to connectors, antennas, capacitors, radio frequency components, electromagnetic interference (EMI) capacitors, and other externally mounted housing connections. The assembly and method described can also be used to couple the housing 210 to another housing or to couple a gas passage tube to the housing 210. A gas passage tube allows gas to enter and exit the housing 210.

The component 200 can have a signal cable 202 extending from at least one end. The signal cable 202 can be a variety of signal feeds, for example but not limited to, electrical cable, fiber optic cable, or thermal feed. The signal cable 202 can be electrically insulated from a component body 204 by an insulator 206. The insulator 206 encircles the signal cable 202 and supports the signal cable 202 in the center of the component 200. The thickness of the insulator 206 can vary based on the properties of the signal cable 202. The component body 204 can have a circular cross section. The component body 204 extends around the circumference of the component 200. On the end of the component 200 that couples to the housing 210, the component body 204 extends towards the housing 210 to form a component skirt 226.

Figure 1:
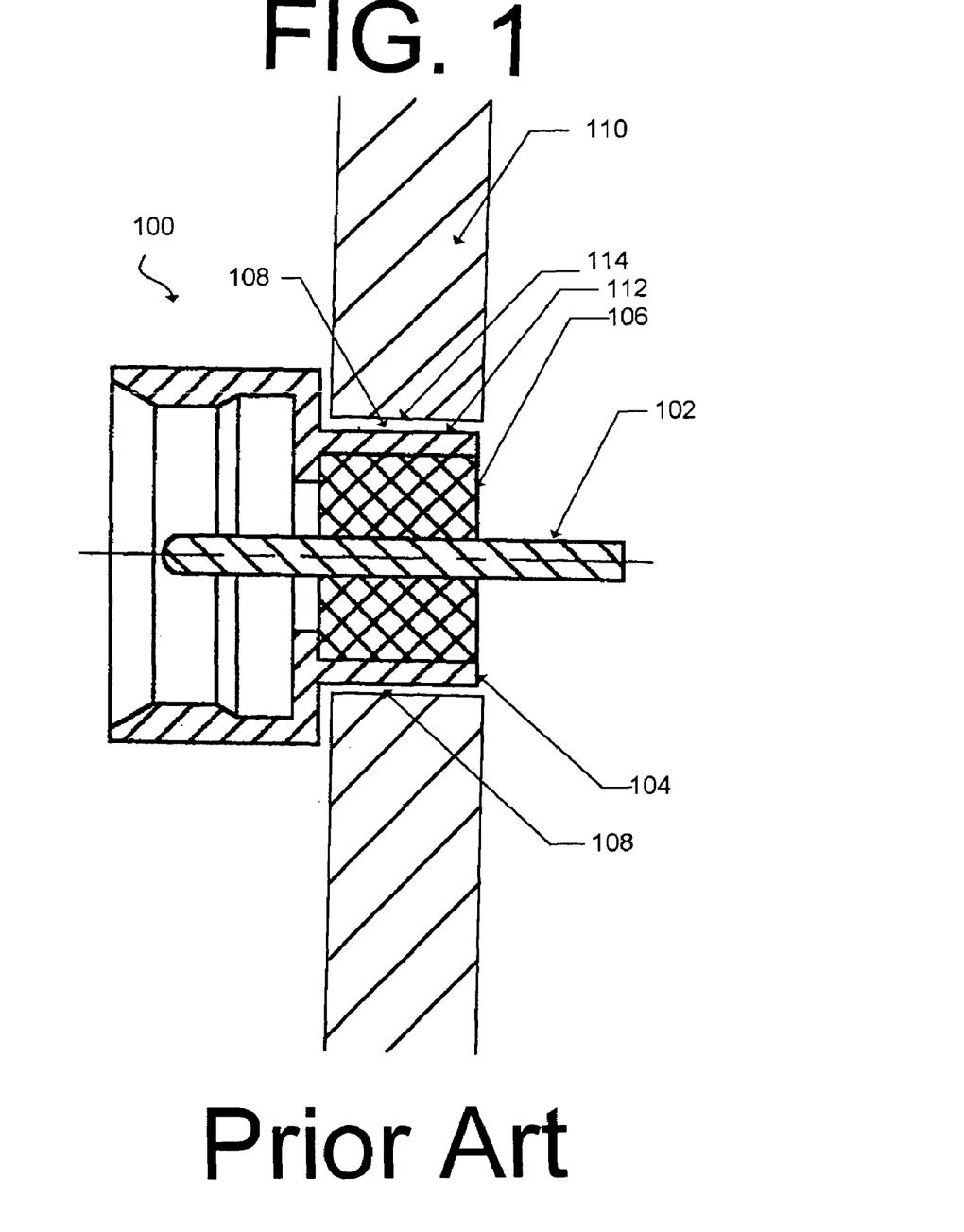
FIG. 1 is a sectional view of a first component coupled to a housing in accordance with the prior art.
Figure 2:
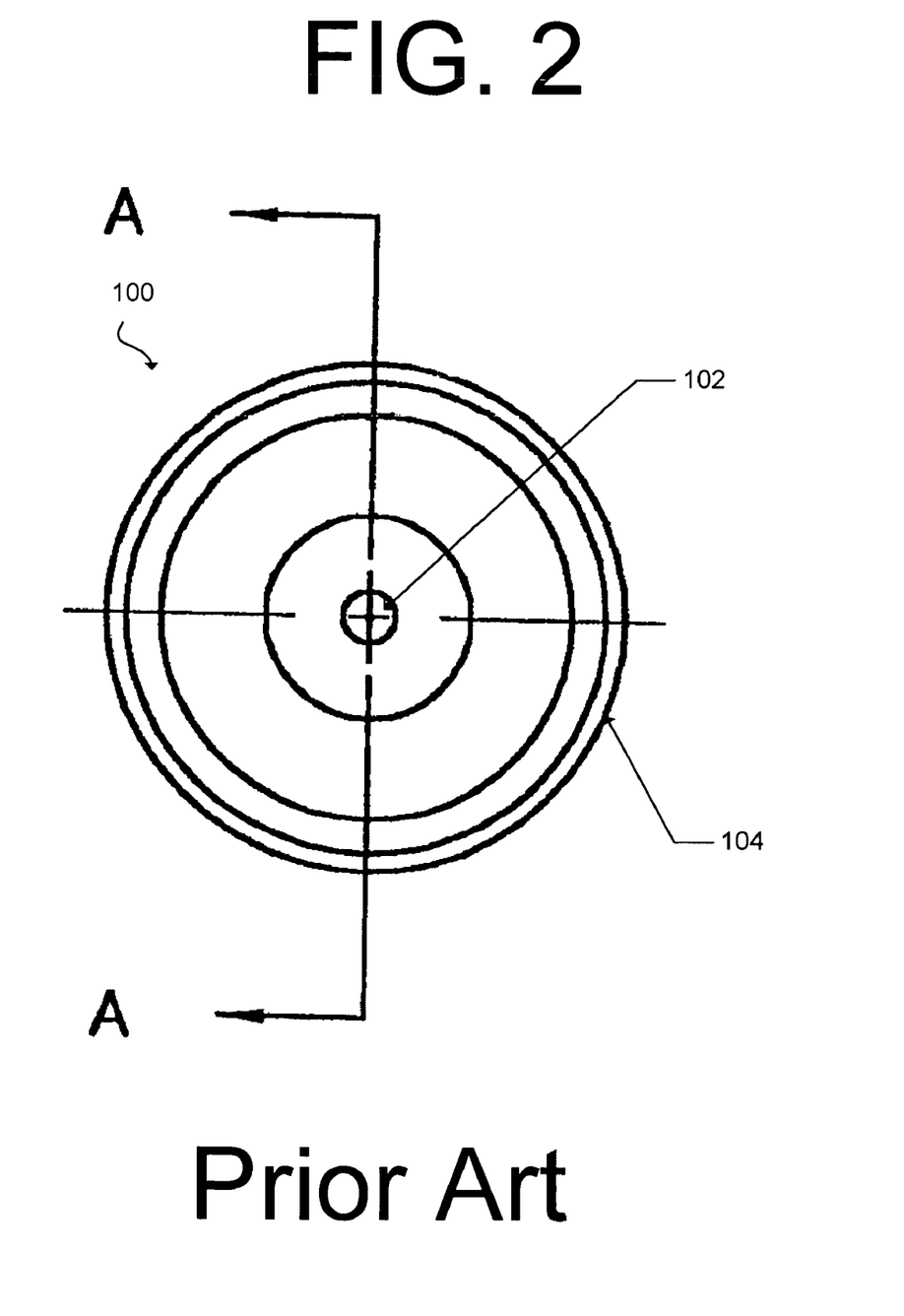
FIG. 2 is an end view of the component of FIG. 1.
Figure 3:
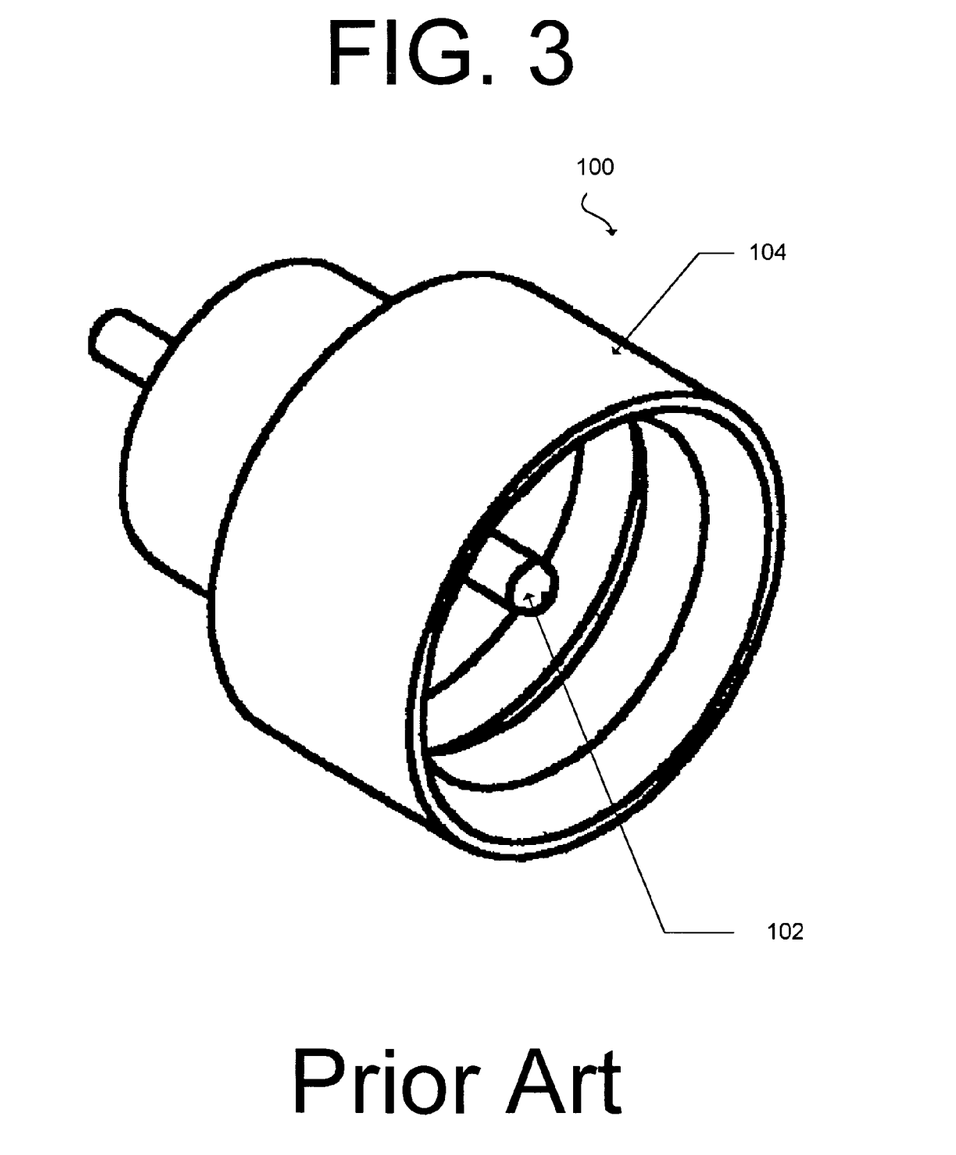
FIG. 3 is a first isometric view of the component of FIG. 1.
Figure 4:
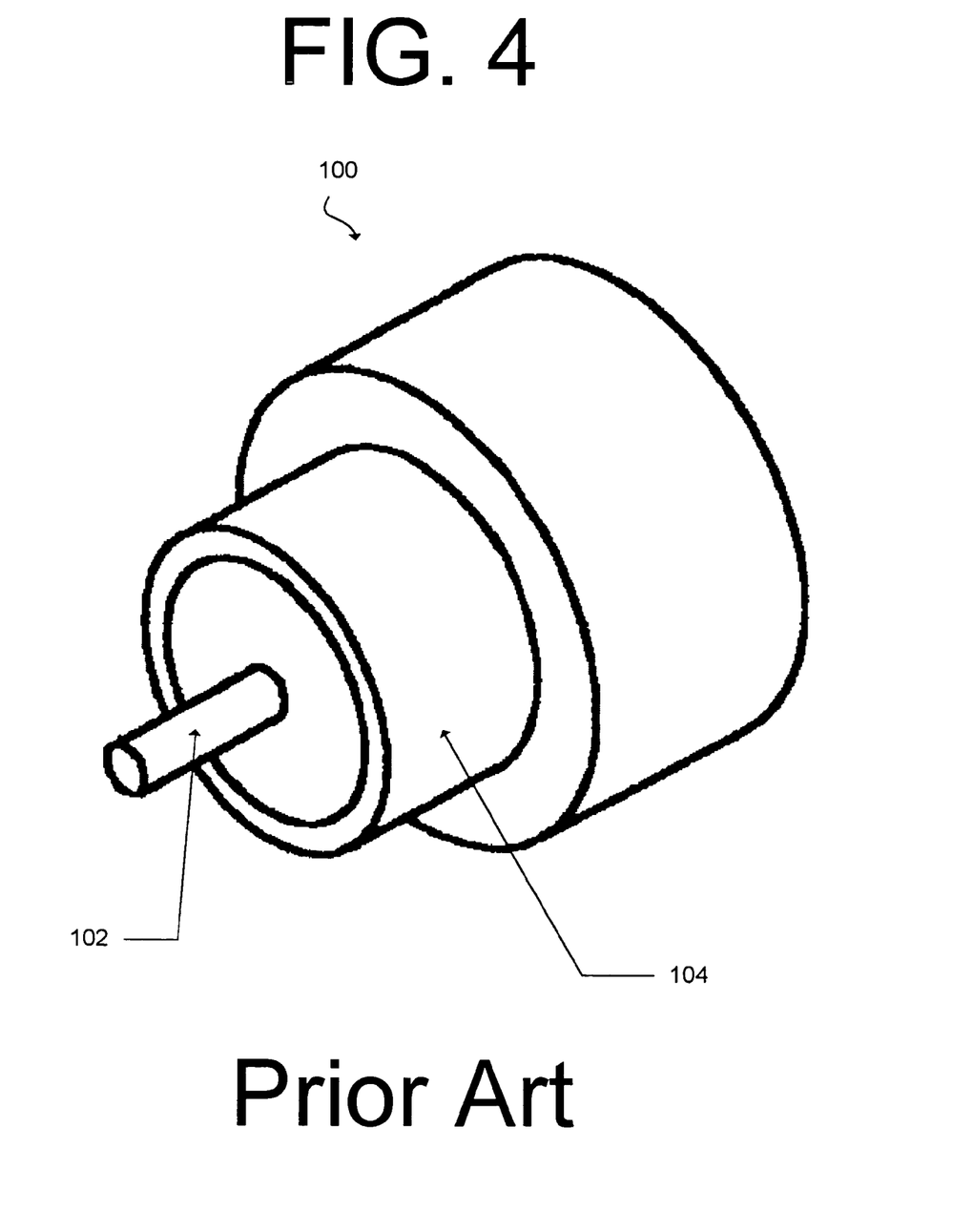
FIG. 4 is a second isometric view of the component of FIG. 1.
Figure 5:
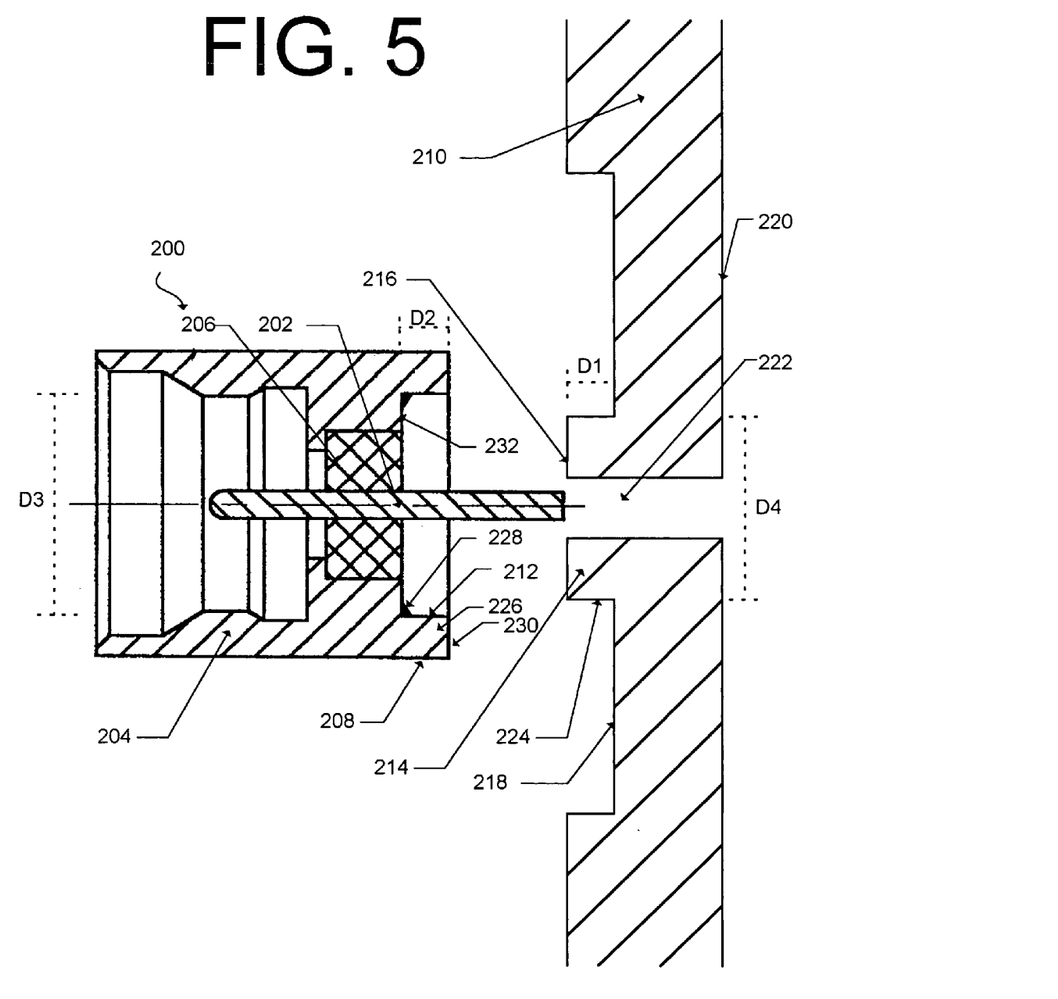
FIG. 5 is a sectional view of a component spaced from a housing in accordance with a first exemplary embodiment of the invention.
Figure 5A:
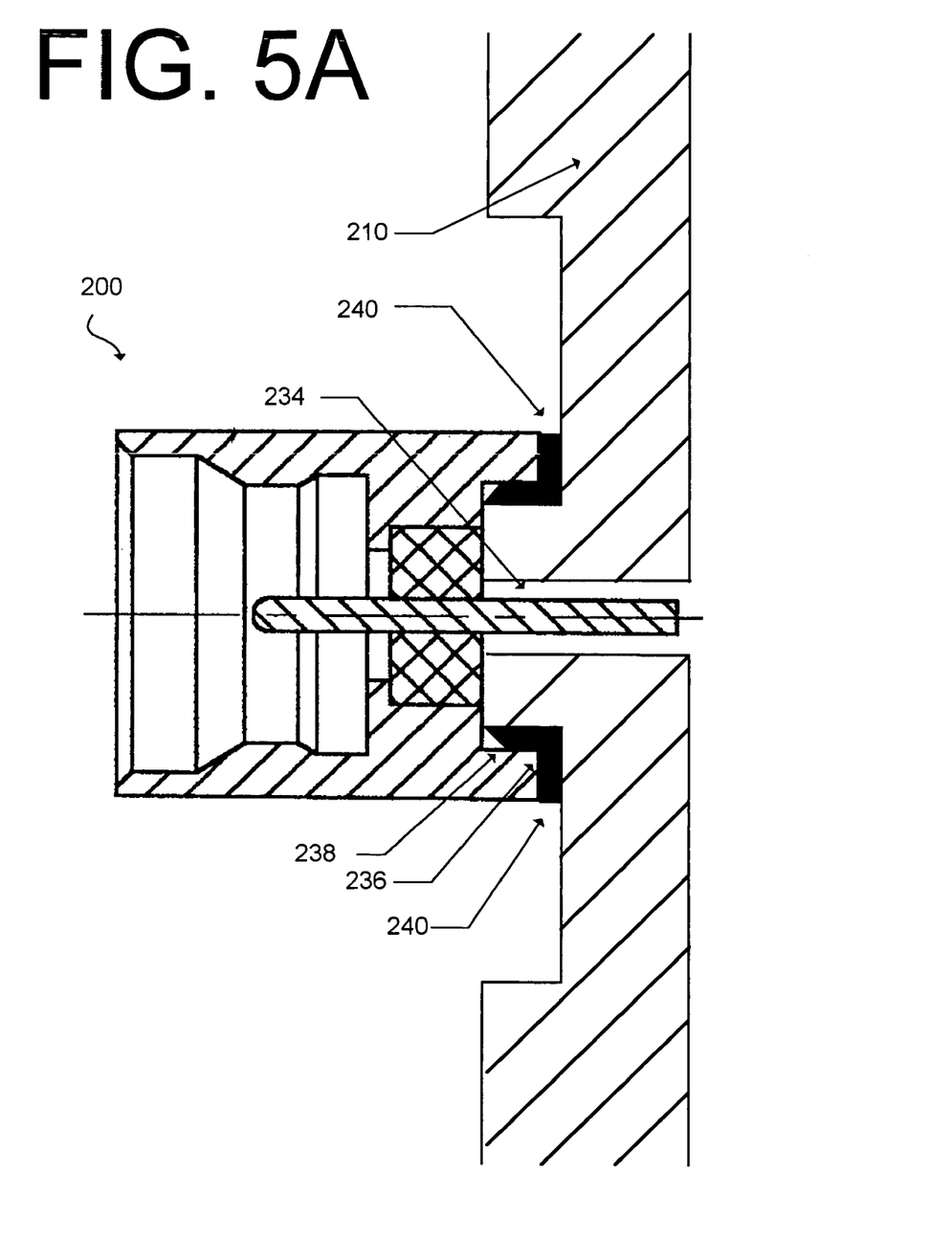
FIG. 5A is a sectional view of the component and housing of FIG. 5 coupled in accordance with the first exemplary embodiment of the invention.
Figure 6:
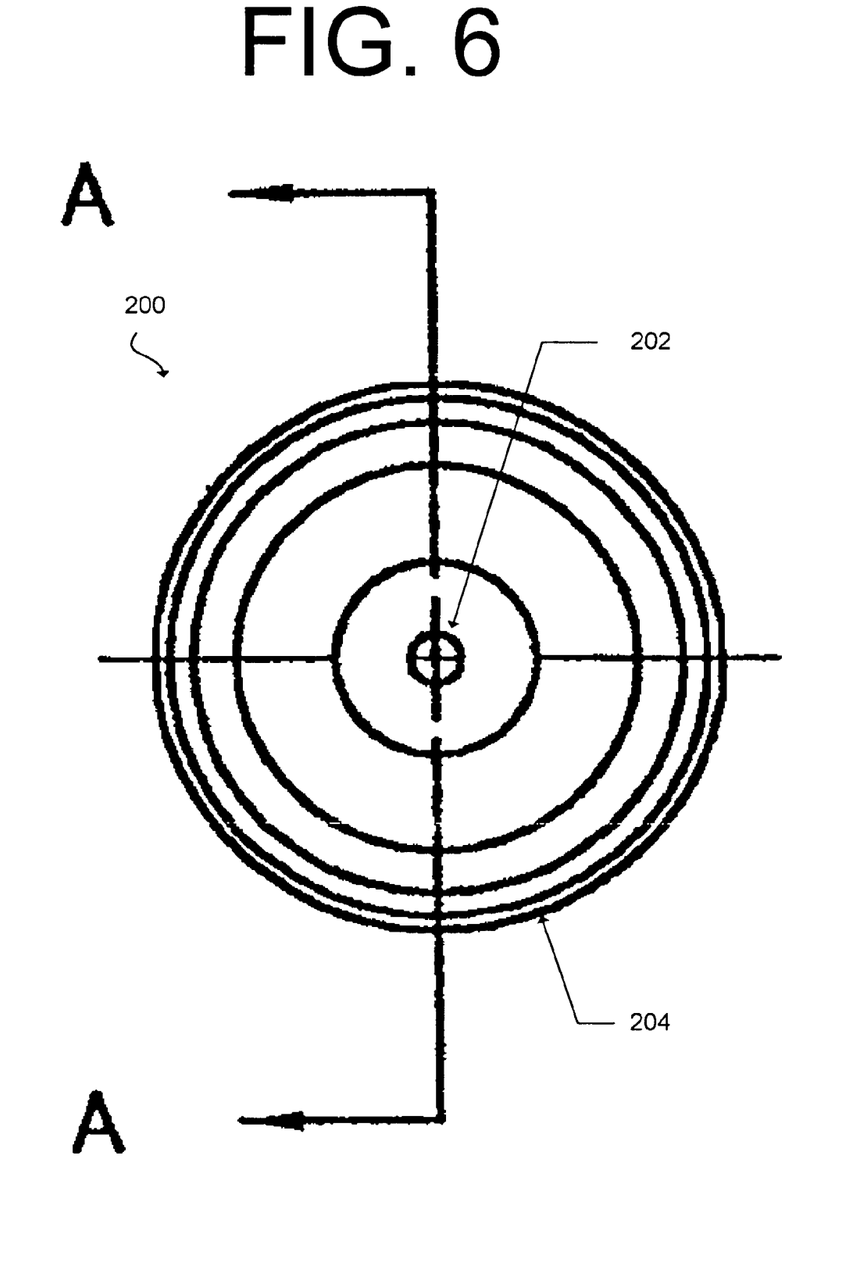
FIG. 6 is an end view of the component of FIG. 5.
Figure 7:
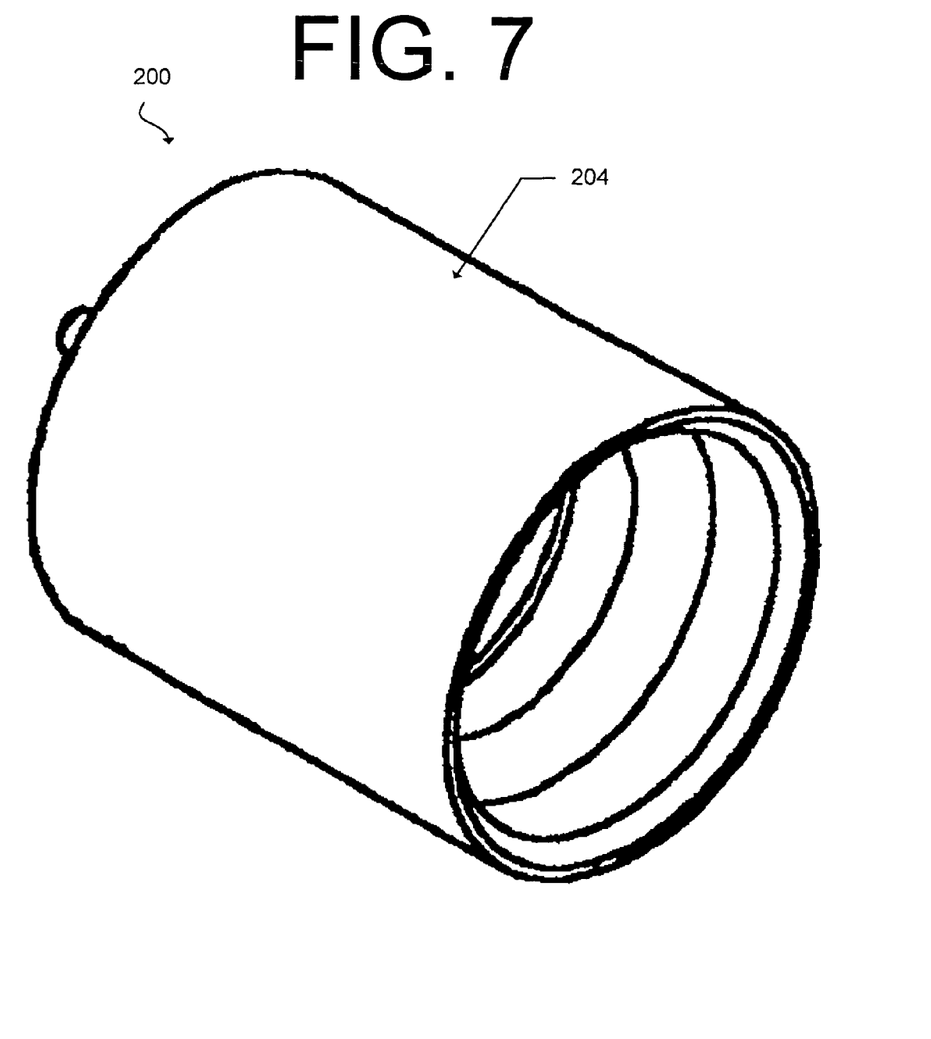
FIG. 7 is a first isometric view of the component of FIG. 5.
Figure 8:
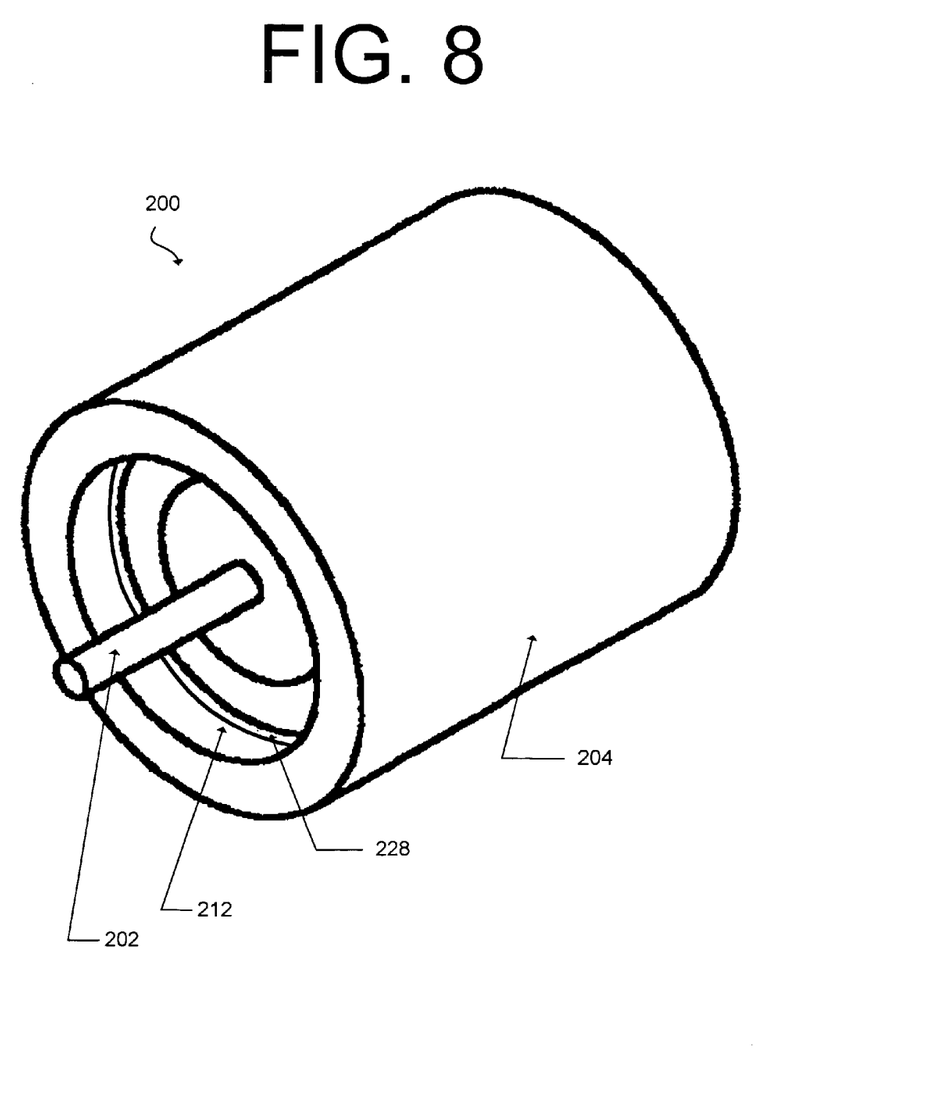
FIG. 8 is a second isometric view of the component of FIG. 5.

The component skirt 226 has an exterior surface 208 located on the outside circumference surface of the component skirt 226. The component skirt 226 also has an interior surface 212 that forms a solderable surface on the inside of the component skirt 226. An exterior bottom surface 230 is located on the bottom of the component skirt 226 and extends between the exterior surface 208 and the interior surface 212. The exterior bottom surface 230 also provides a solderable surface for the housing 210. An interior bottom surface 232 is located within the component skirt 226 on an interior bottom surface of the component 200. The interior bottom surface 232 extends between the interior surface 212 and the insulator 206. A chamfer 228 or step (not shown) may be used to help center the component 200 on a protrusion 214 of the housing 210 and maintain a uniform gap during the soldering process, described later herein. The chamfer 228 is located on the corner between the interior surface 212 and the interior bottom surface 232. Although the component cross-section is shown as circular, non-circular shapes may be used without departing from the present invention.

The housing 210 has a first surface 216, a second surface 218, and a third surface 220. The protrusion 214 extends from the second surface 218 to the first surface 216. An opening 222 extends from the first surface 216 to the third surface 220 and is sized to allow the signal cable 202 to extend therethrough. The opening 222 may also be sized to provide an insulation air gap 234 between the housing 210 and the signal cable 202, as shown in FIG. 6A. The insulation air gap 234 provides insulation between the signal cable 202 and the housing 210. The signal cable 202 connects to a circuit board or other device located within the housing 210.

The height of the protrusion 214 is greater than the height of the interior surface 212 as shown in FIG. 5A. The space produced allows the solder to flow to the interior surface 212 through a first solder gap 236. The height of the protrusion 214 identified as X1 is the distance between the first surface 216 and the second surface 218 as shown in FIG. 5. The height of the interior surface 212 identified as X2 is the distance between the interior bottom surface 232 of the component 200 and the exterior bottom surface 230 of the component 200. This provides the first solder gap 236 between the second surface 218 and the bottom exterior surface 226 when the component 200 is coupled to the housing 210. The first solder gap 236 is equal to the difference between X1 and X2 and is sized to form a capillary channel for the solder to flow during the soldering process.

Similarly, the diameter of the component skirt 226 is slightly larger than the outside diameter of the protrusion 214 to allow the solder to flow between the interior surface 212 and the protrusion 214 during the soldering process. The protrusion 214 has an exterior solderable surface 224 along the side edge of the protrusion 214. The diameter of the protrusion 214, identified as D2, can be smaller than the diameter of the interior surface 212 of the component 200, identified as D2. This provides a second solder gap 238 between the interior surface 212 and an exterior solderable surface 224 of the protrusion 214 when the component 200 is coupled to the housing 210. The second solder gap 238 is equal to half the difference between D1 and D2 and is sized to form a capillary channel for the solder to flow during the soldering process.

The soldering process mechanically couples the component 200 to the housing 210 to provide a complete hermetic assembly (as shown in FIG. 5A). The solder may be a soft solder, for example, but not limited to, Sn 62, Sn 63, Sn 96, or Sb 5 with a CTE of 23–30 ppm/° C. Soft solder is more desirable because it absorbs strain better than hard solder and thereby limits stress levels. The first solder gap 236 and second solder gap 238 are sized to achieve a thick conformal solder joint. A conformal solder joint has a thickness sufficient to absorb strain without failure. The desired maximum width or radial gap of the first solder gap 236 and second solder gap 238 is the maximum gap that still allows capillary action of the solder. The designed first solder gap 236 and second solder gap 238 may be greater when using a soft solder than for hard solders. For example, the designed first solder gap 236 and second solder gap 238 for use with soft solders may range around 0.003"–0.007", whereas the first solder gap 236 and second solder gap 238 for use with hard solders, for example 80/20, may be around 0.0005"–0.002". The sizing of the first solder gap 236 and second solder gap 238 provide for optimum capillary action. Solder preforms are placed in a well 240 around the component 200. Heat is applied to melt the solder preforms and fill the well with molten solder. The solder fills the first solder gap 236 around the component 200. The solder then flows into the second solder gap 238 from the first solder gap 236, thereby providing a hermetic seal.

Figure 9:
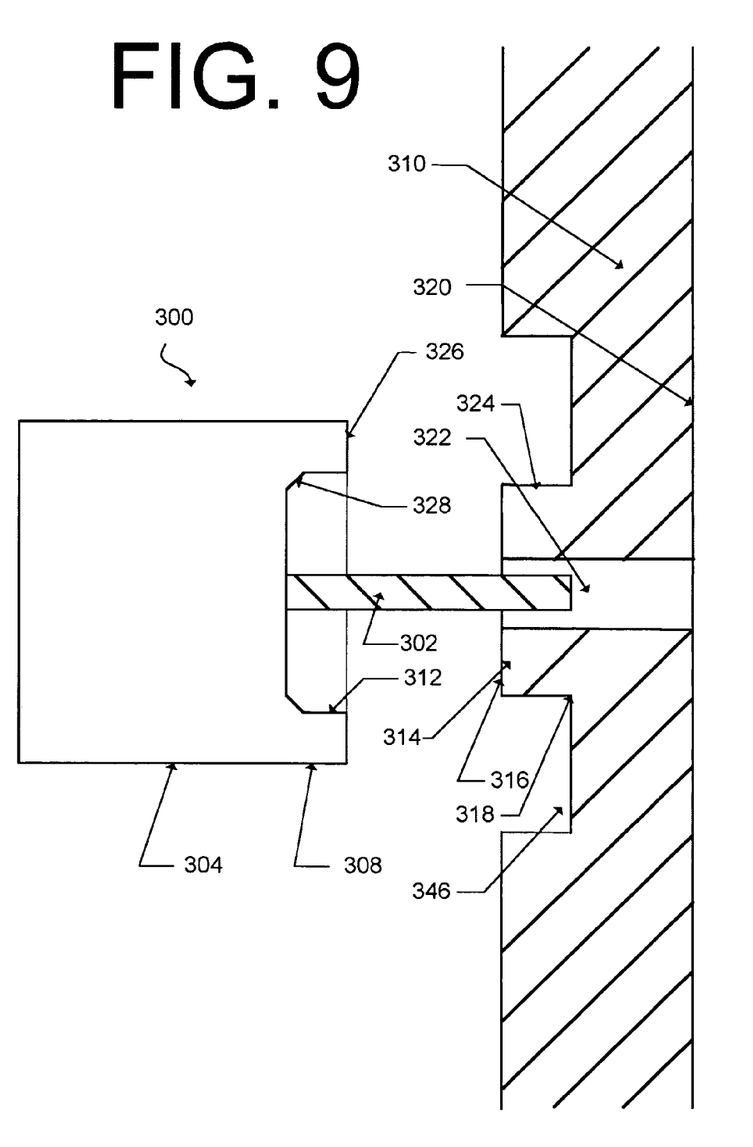
FIG. 9 is a sectional view of a component spaced from a housing in accordance with an exemplary method of the invention.
Figure 9A:
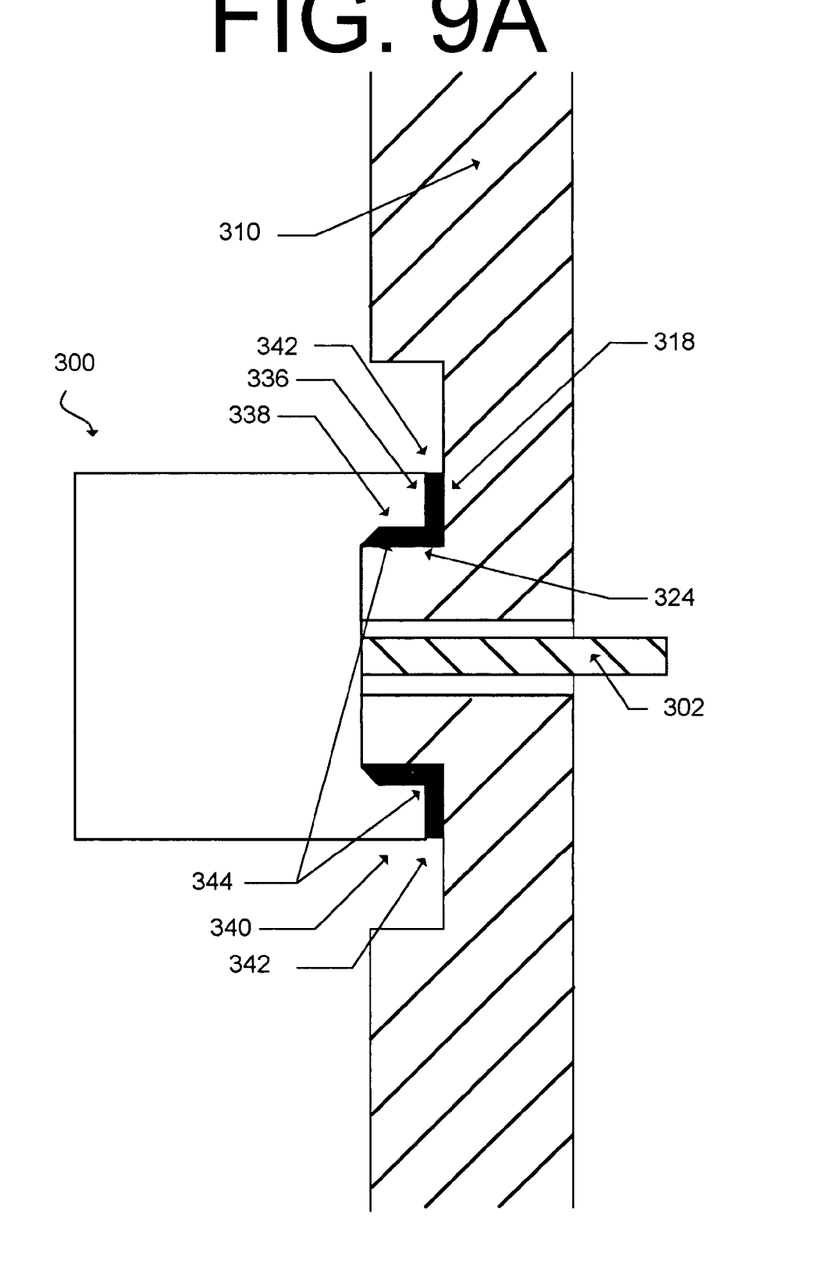
FIG. 9A is a sectional view of the component and housing of FIG. 9 coupled in accordance with an exemplary method of the invention.

FIGS. 9 and 9A show a method of joining a component 300 to a housing 310, in accordance with an embodiment of the invention. The component 300 has a signal cable 302 extending from at least one end. The signal cable 302 is electrically insulated from a component body 304. The component body 304 has a circular cross section that forms an exterior surface 308 and an interior surface 312. A chamfer 328 or step may help center the component 300 on a protrusion 314 on the housing 310 and maintain a uniform gap during soldering. Although the component cross-section is shown as circular, non-circular shapes may be used without departing from the present invention.

The housing 310 has a first surface 316, a second surface 318, and a third surface 320. The protrusion 314 has a height that extends from the second surface 318 to the first surface 316. An opening 322 extends from the first surface 316 to the third surface 320 and is sized to allow the signal cable 302 to extend therethrough. In order to form a first solder gap 336 between a component skirt 326 and the second surface 318, the height of the protrusion 314 is greater than the height of the interior surface 312 of the component 300. The protrusion 314 has an exterior solderable surface 324 along the circular edge surrounding the protrusion 314. The diameter of the protrusion 314 is smaller than the interior diameter of the component skirt 312. A second solder gap 338 exists between the interior surface 312 of the component 300 and the exterior solderable surface 324 of the protrusion 314.

The component 300 may be coupled to the housing 310 through a soldering process, providing a complete hermetic assembly. The solder 344 may be a soft solder, for example, but not limited to, Sn 62, Sn 63, Sn 96, or Sb 5 with a CTE of 23–30 ppm/° C. Soft solder is more desirable because it absorbs strain better than hard solder and thereby limits stress levels. The first solder gap 336 and second solder gap 338 are sized to achieve a thick conformal solder joint. A conformal solder joint has a thickness sufficient to absorb strain without failure. The desired maximum width of the first solder gap 336 and the second solder gap 338 is the maximum width that still allows reliable capillary action of the solder. The solder 344 fills the first solder gap 336 and forms a well 340 around the component 300. The solder 344 then flows into the second solder gap 338 from the first solder gap 336, thereby providing a hermetic seal.

The method positions the component 300 over the protrusion 314 of the housing 310. The component skirt 308 is positioned over the protrusion 314. The first surface 316 rests against the interior bottom surface 332. The chamfer 328 helps to center the protrusion 314 into the center of the component skirt 308. This provides a uniform second solder gap 338 around the circumference between the protrusion and the component skirt 308. A cross-sectional view of both the first solder gap 336 and second solder gap 338 may have an "L" shape as shown in FIG. 9A. Solder preforms are placed within a well 346. Heat to melt the solder 344 can be applied to either the housing 310, the component 300, or both. The molten solder is applied to a mouth 342 of the first solder gap 336. The heat causes the solder 344 to wick from the mouth 342 of the first solder gap 336 and flow into the second solder gap 338 between the interior surface 312 of the component skirt 308 and the exterior solderable surface 324 of the protrusion 314. The component 300, solder 344, and housing 310 are allowed to cool to form a soldered connection with a hermetic seal.

The solder joint formed between the component 300 and the housing 310 is in compression during cool down of the solder. To accomplish this, the component skirt 326 is made of a material having a coefficient of thermal expansion (CTE) equal to or greater than the CTE of the housing 310. For example, the component 300 may be made of alloy 48/49 with a CTE of 8–9 ppm/° C. and the housing 310 may be made of kovar with a CTE of 5 ppm/° C. The CTEs listed herein are nominal values and are not meant to be limiting.

Removing material or molding the material of the housing 310 to produce an indentation 346 as shown in FIG. 9 can produce the protrusion 314 of the housing 310. The indentation 346 is sized to allow the component skirt 326 of the component 300 to fit within the indentation 346. Additional space can also be provided surrounding the protrusion 314. The additional space allows the solder 344 to be applied at the mouth 342 of the first solder gap 336 during the soldering process as shown in FIG. 9A. The additional space can also be used to form the well 340 of molten solder 344 from which the first solder gap 336 draws from during the soldering process.

A properly soldered coupling can be generally confirmed by examining the amount of solder remaining within the well 340. The amount of space within the first solder gap 336 and the second solder gap 338 can be calculated based on the components. This amount of space is subtracted from the initial amount of solder material in the preforms. The amount of additional solder can be viewed within the well 340 after the coupling has been soldered. Based on the tolerances of the coupling and the size of the well 340, an individual can determine acceptable amounts of solder that can remain in the well and still provide an acceptable hermetic coupling. This provides a quality control resource for the hermetic coupling.

Figure 10:
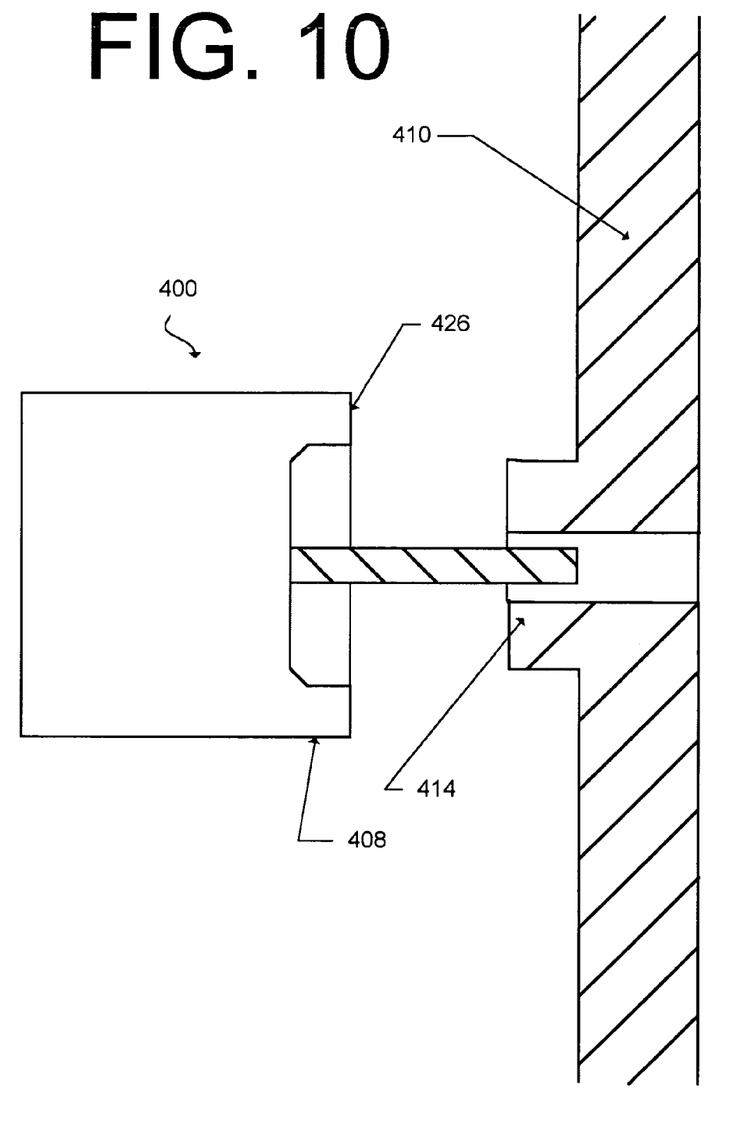
FIG. 10 is a sectional view of a component spaced from a housing in accordance with a second exemplary embodiment of the invention.

FIG. 10 is a sectional view of a component 400 spaced from a housing 410 in accordance with a third exemplary embodiment of the invention. In the second exemplary embodiment discussed above, material of the housing 410 is constructed to produce the indentation 346 and the protrusion 314, as shown in FIG. 9. The protrusion 414 can also be produced without the indentation 346 as shown in FIG. 10. The protrusion 414 is sized to allow the component skirt 426 of the component 400 to fit over the protrusion 414. The process used to solder the component 400 and housing 410 can be similar to the process described in previous embodiments. The solder can also be applied directly to the first solder gap. The material used to produce the component skirt 408 and housing 410 is also selected in the same manner as described in previous embodiments.

It should be emphasized that the above-described embodiments of the present invention are merely possible examples of implementations, simply set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A connection, comprising:
   a component having a skirt with an interior surface surrounding a signal cable and
   a housing having an opening sized to receive the signal cable and the opening is surrounded by a protrusion with an exterior surface sized to receive the interior surface of the skirt and provide a solderable gap wherein the protrusion of the housing has a coefficient of thermal expansion less than the skirt of the component.

2. The connection of claim 1, wherein a distal end of the interior surface has a chamfer.

3. The connection of claim 1, wherein a distal end of the interior surface has a step.

4. The connection of claim 1, wherein the opening is sized to provide an air gap surrounding the signal cable.

5. The connection of claim 1, wherein the component is an electromagnetic interference capacitor.

6. The connection of claim 1, wherein the skirt of the component and the protrusion of the exterior surface have a generally circular surface.

7. The connection of claim 1, wherein the solderable gap forms an "L" shaped cross-section between the skirt and the housing.

8. The connection of claim 1, wherein solder that fills the solderable gap is drawn from an indentation containing solder.

9. The connection of claim 1, wherein the housing is made of kovar and the component skirt is made of steel.

10. The connection of claim 1, wherein the solderable gap has a width of about 0.003 inches to about 0.007 inches for soft solder.

11. A coupling, comprising:
    a component having a generally circular wall surrounding a signal cable and the wall having an interior surface and bottom edge;
    a housing having an opening sized to receive the signal cable surrounded by a protrusion with an exterior surface to receive the interior surface and a bottom wall sized to receive the bottom edge wherein the housing has a coefficient of thermal expansion less than the wall of the component; and
    solder coupling the interior surface and bottom edge of the component to the exterior surface and the wall of the housing wherein the solder forms a hermetic seal.

12. The coupling of claim 11, wherein a distal end of the interior surface has a chamfer.

13. The coupling of claim 11, wherein a distal end of the interior surface has a step.

14. The coupling of claim 11, wherein the component is an electromagnetic interference capacitor.

15. The coupling of claim 11, wherein the component is a radio frequency connector.

16. A method of coupling a component to a housing, comprising the steps of:
    positioning a signal cable of a component through an opening in a housing;
    positioning a component skirt of the component over a protrusion of the housing;
    applying heat to the housing and component skirt;
    applying solder to a mouth of a first solder gap; and
    drawing solder through the first solder gap and into a second solder gap wherein the second solder gap is perpendicular to the first solder gap.

17. The coupling of claim 16, wherein positioning a component skirt further comprises the step of:
    centering the component over the protrusion with chamfer.

18. The coupling of claim 16, further comprising the step of:
    collecting the excess solder in a well at the mouth of the first solder gap.

19. The coupling of claim 16, wherein the housing has a lower coefficient of thermal expansion than the wall of the component.

20. The coupling of claim 16, further comprising the step of:
    determining a properly hermetic coupling by observing the excess solder in a well at the mouth of the first solder gap.

21. An electrical connection, comprising:
    a means for coupling with an interior surface surrounding a signal cable and
    a means for receiving the coupling means coupled to a housing and having an opening sized to receive the signal cable and the opening surrounded by a protrusion with an exterior surface sized to receive the interior surface of the skirt and provide an optimal solderable gap wherein the coupling means has a coefficient of thermal expansion greater than the receiving means.

* * * * *